United States Patent
Matthias et al.

(10) Patent No.: US 9,734,421 B2
(45) Date of Patent: *Aug. 15, 2017

(54) METHOD AND DEVICE FOR INSPECTING THE VOLUME AND THE COMPOSITION OF AT LEAST ONE SAMPLE

(71) Applicants: Torsten Matthias, Wendelsheim (DE); Hans-Peter Schimon, Heiningen (DE); Jens Blecken, Fuerfeld (DE); Markus Wulf, Alzey (DE)

(72) Inventors: Torsten Matthias, Wendelsheim (DE); Hans-Peter Schimon, Heiningen (DE); Jens Blecken, Fuerfeld (DE); Markus Wulf, Alzey (DE)

(73) Assignee: Torsten Matthias, Wendelsheim (DE)

( * ) Notice: Subject to any disclaimer, the term of this patent is extended or adjusted under 35 U.S.C. 154(b) by 282 days.

This patent is subject to a terminal disclaimer.

(21) Appl. No.: 14/354,908

(22) PCT Filed: Oct. 29, 2012

(86) PCT No.: PCT/EP2012/004528
§ 371 (c)(1),
(2) Date: Apr. 28, 2014

(87) PCT Pub. No.: WO2013/060483
PCT Pub. Date: May 2, 2013

(65) Prior Publication Data
US 2014/0300727 A1    Oct. 9, 2014

(30) Foreign Application Priority Data

Oct. 28, 2011 (DE) .................. 10 2011 117 310
Oct. 28, 2011 (DE) .................. 10 2011 117 323

(51) Int. Cl.
*G06K 9/32* (2006.01)
*G06K 9/00* (2006.01)
(Continued)

(52) U.S. Cl.
CPC .......... *G06K 9/3216* (2013.01); *G06T 7/0012* (2013.01)

(58) Field of Classification Search
CPC .......................... G06K 9/3216; G06T 7/0012
(Continued)

(56) References Cited

U.S. PATENT DOCUMENTS 6,388,750 B1 * 5/2002 Liu .................. G01F 23/292
356/246
2004/0231438 A1 * 11/2004 Schwartz .............. B01L 3/0217
73/864.17
(Continued)

OTHER PUBLICATIONS

Clavius ("Photography Crosshairs," pub. Mar. 2010, available at http://www.clavius.org/photoret.html).*
(Continued)

*Primary Examiner* — Sath V Perungavoor
*Assistant Examiner* — Patricia I Young

(57) ABSTRACT

The present invention relates to a method and a device for inspecting a volume and/or a composition of at least one, especially fluid, sample. The method comprises the steps of making available at least one pipette, in which an interface is formed between a sample and a fluid which is adjacent to the sample. That interface being optically perceptible outside the pipette as an interface line between the sample and at least one fluid that extends approximately (about) horizontally A camera is arranged in an image so that the marking and at least a first section of the at least one pipette is shown in a recorded image (Continued)

The present invention thus provides an apparatus and method for a singular approach to detecting, evaluation and recording results.

58 Claims, 4 Drawing Sheets

(51) Int. Cl.
| | | |
|---|---|---|
| *G06F 19/00* | (2011.01) | |
| *G01N 1/14* | (2006.01) | |
| *G01N 21/59* | (2006.01) | |
| *G06T 7/00* | (2017.01) | |

(58) Field of Classification Search
USPC .......................................................... 348/86
See application file for complete search history.

(56) References Cited

U.S. PATENT DOCUMENTS

2007/0021929 A1* 1/2007 Lemmo ............ G01N 35/00613
702/22
2007/0177778 A1* 8/2007 Massaro ............ G01N 35/1016
382/128

OTHER PUBLICATIONS

Li ("An Introduction to Focus Stacking," Digital Photography School, pub. Jul. 2010, available at http://digital-photography-school.com/an-introduction-to-focus-stacking/).*

* cited by examiner

METHOD AND DEVICE FOR INSPECTING THE VOLUME AND THE COMPOSITION OF AT LEAST ONE SAMPLE

This application is a National Stage Application of PCT/EP2012/004528 filed on Oct. 29, 2012, which claims priority from German Application No. DE 10 2011 117 323.8. filed on Oct. 28, 2011, German Application No. DE 10 2011 117 310.6 filed on Oct. 28, 2011 and PCT/EP2012/004491 filed on Oct. 26, 2012. Each of these applications is hereby incorporated by reference herein in its entirety.

BACKGROUND OF THE INVENTION

The invention relates to a method and a device for inspecting the volume and/or composition of at least one, especially fluid sample, in which at least one interface is formed in at least one pipette between at least one sample and at least one fluid which is adjacent to the at least one sample and in at least one second pipette at least one second interface is formed between at least one second, especially fluid sample and at least one second fluid which is adjacent to the at least second sample. The invention further relates to the use of a camera with a marking in an image field of the camera to carry out such a method.

In DE 10 2008 022 835 B3, a device is described as an analyser for analysing biological or chemical samples using a reagent liquid added via a pipette. A work plate is arranged so that it can be horizontally pivoted on a base plate to retain the samples in a sample holder, for example, a microtitre plate, which features several cells to retain the samples. The cells are also called slots, cavities or wells, occasionally also droplets. Arranged above the work plate is a robot manipulator, which has a horizontal support arm with a slide, said slide having a needle system attached that moves in a vertical direction. The needle system comprises several hollow needles as pipettes, which come to a stop at the same time over a single well, whereby one of the hollow needles pours the reagent liquid into the well. After a reaction or incubation time the solution, which is made of a sample in the well and the added reagent liquid, is suctioned off by a second hollow needle, supplied with a washing solution by a third hollow needle, and then suctioned off again by the second hollow needle. Using the three hollow needles, a single well is therefore filled-with reagent liquid and washing solution. The analyser itself does not contain any elements for evaluating the cells or wells, these are evaluated at a later stage by an expert. The samples are labelled with barcodes for the subsequent analysis, with the analyser featuring a device to read the barcodes in its rear section. When reacting with the reagent liquid the samples undergo a colour change and/or a fluorescence, which can be analysed and/or evaluated using a photometer for measuring colour.

As a result of the great number of solutions that are to be produced from a sample and a reagent liquid, which need to be produced as part of complete test series, it is necessary to produce these solutions at high process speed under stable process conditions and by using as low quantities as possible for the sample and the reagent liquid. In addition, the wells should be loaded in as simple a manner as possible for cost reasons. The analyser described above is disadvantageous inasmuch as the needle system with three needles as pipettes only adds a reagent liquid to a well in the amount to be pipetted and the amount that is to be pipetted is set via a drive associated with the first needle, which only guarantees the required process accuracy in terms of the quantity being set to a limited extent.

SUMMARY OF THE INVENTION

The object of the invention is therefore to avoid the disadvantages of the prior art, by producing solutions in each case from a sample and a fluid, for example in the form of a reagent or dilution liquid, using the lowest possible quantities for the sample and the fluid at high process speed.

This object is achieved using a method according to Claim 1, using a camera according to Claim 10 and a device according to Claim 11. Advantageous further embodiments of the invention are the subject of the dependent claims.

The method according to the invention for inspecting a volume and/or a composition of at least one, especially fluid sample comprises the provision of at least one pipette, in which at least one interface is formed between at least one sample and at least one fluid which is adjacent to the at least one sample, said interface being optically perceptible outside the pipette as an interface line between at least one sample and at least one fluid that extends essentially horizontally; the arrangement of at least one marking of a camera in an image field of the camera such that the at least one marking and at least a first section of the at least one pipette are reproduced on a recorded image, the at least one pipette being arranged between a light source and the camera such that at least one spectrum of light beams of the light source is recorded by the camera, said light beams having passed through the at least one sample; the evaluation of whether the at least one marking in the recorded image matches the position of the at least one interface line in the at least first section; the comparison of at least one recorded spectrum with at least one reference spectrum; and the determination of whether the composition of the at least one sample in accordance with the at least one recorded spectrum corresponds to that of the at least one reference spectrum.

A further embodiment of the method according to the invention for inspecting the volume and/or the composition of the at least one sample comprises the provision of at least one pipette, in which at least one interface line is formed between the at least one sample and at least one fluid which is adjacent to the at least one sample, said interface being optically perceptible outside the pipette in each case as an interface line between the at least one sample and at least one fluid that extends essentially horizontally. Furthermore the method comprises the provision of at least one second pipette, in which at least one second interface is formed between at least one second, especially fluid sample and at least one second fluid which is adjacent to the at least second sample, said interface being optically perceptible outside of the at least second pipette, in each case as an at least second interface line between the at least second sample and the at least second fluid that extends essentially horizontally. The method further comprises an arrangement of at least one marking of a camera in an image field of the camera such that the at least one marking, at least one section of the at least one pipette and at least one second section of the at least second pipette can be reproduced on a recorded image; and an evaluation of whether in the recorded image the at least one marking is at the same height as the at least one interface line in the at least one section and the at least second interface line in the at least second section. By using a camera with a marking which is arranged in the image field of the camera, the position at least of one of the first interface line in the first section and the second interface line in the second section and thereby the position of the first sample within the first pipette and/or the second sample within the second pipette can be accurately determined. As on an image recorded using the camera a section of the at least one pipette and the at least second pipette are reproduced in addition to the marking, it is possible that the at least one and/or the at least second interface line are reproduced on the recorded image. In this case, for example, by comparing the recorded image with one or several reference images, it can be evaluated whether the marking is at the same height as the first and/or second interface line. The marking, which is only in the image field of the camera and does not have to be present in an environment for recording as an image, may be formed in addition to other variations as an Inspection line, inspection point, inspection spot or inspection cross that extends essentially horizontally and which is at the same height as the first and/or second interface line if the first and/or second interface line is aligned with the inspection line. In a comparison of the recorded image with a reference image, this comparison can be made, for example, by comparing the brightness levels of different pixels of the recorded image with brightness levels of different pixels of the reference image, which are located at relevant positions on the recorded image and the reference image and if the brightness levels in a specified range of values are consistent, a conformity of the brightness levels of the compared pixels is determined. This pattern matching between the recorded image and the reference image can take place automatically using a PC (personal computer). If a high contrast is displayed between the first sample and the first fluid and/or the second sample and the second fluid and the first and/or second interface line are/is reproduced at high quality in the recorded image, alternatively or additionally to comparing this image with a reference image, the evaluation can be made based on a specified selection criterion, for example based on a specified number of adjoining pixels in one direction between the marking and the first and/or second interface line.

As sections of both pipettes are reproduced on one recorded image, with the first pipette comprising the first sample and the second pipette the second sample, in the event that no interface line visible outside the pipettes is reproduced on any recorded section, whether the first sample is present in the first section and/or the second sample is present in the second section can be evaluated, for example, by means of pattern matching or based on a specified selection criterion. A colour value that is characteristic of the sample is a possible selection criterion. This can be detected by the camera as the pipette is at least partially transparent. In the event of a negative evaluation result as to whether the marking in the recorded image is at the same height as at least one of the first and second interface lines, it can therefore be determined whether the first sample is present in the first section and/or the second sample is present in the second section.

For a reproduction of the first interface line and/or the second interface line together with the marking it is also possible with just one recorded image to determine whether the Interface line at least of one of the first and second samples is located at a pre-defined position in the longitudinal direction of at least one of the first and second pipettes. By this means a fill level of the first sample in the first pipette and/or the second sample in the second pipette can be determined, by which means the volume at least of one of the first and second samples can be inspected. Inspecting several volumes of different samples enables the process speed when producing solutions comprising these samples, to be increased. Furthermore, by means of recording the image of the marking and the possibly two interface lines, a defined time for inspecting the volumes of the first sample and the second sample can be established. Provided the specified volumes for the first sample and the second sample are inspected using the inspection method according to the invention, these are available immediately after the inspection for further analysis or processing, for example as a result of transferring the two samples into adjacent wells of a microtitre plate.

According to the invention it is further provided that the pipette is arranged between a light source and the camera such that a spectrum of light beams of the light source that have passed through the sample can be recorded by the camera. In this case the evaluation unit, which compares the marking in the recorded image with the position of the interface line, comprises additional means which compare the recorded spectrum with a reference spectrum and establish whether, in accordance with the recorded spectrum, the composition of the sample corresponds to that of the reference spectrum.

For the method according to the invention for inspecting the volume and/or the composition of at least one, especially fluid sample, the pipette(s) is/are preferably arranged between a light source and the camera such that in each case a spectrum of light beams of the light source is recorded by the camera, said light beams having passed through a meniscus and/or a section of the sample directly beneath the meniscus of the sample(s), which is/are formed from one edge of the interface to an inner wall of the pipette(s), the recorded spectrum/spectra is/are compared with one/several reference spectrum/reference spectra and it is determined whether the composition of the sample(s) in accordance with the recorded spectrum/spectra corresponds to that/those of the reference spectrum/reference spectra. According to the invention, the term "directly beneath the meniscus" refers to at least the height of 0.5 times, in particular 1.0 times and preferably 1.5 times the meniscus and as a maximum the height of 3 times or 4 times, in particular 5, 6, 7, 8 times, particularly preferably 10 times the height of the meniscus.

For the method according to the invention for inspecting the volume and/or the composition of at least one, especially fluid sample, a determination of whether haemolytic and/or lipaemic factors are present in the sample(s) is preferably achieved by comparing the recorded spectrum/spectra with a/several reference spectrum/reference spectra.

Sample substances according to the invention are, for example, blood, serum and/or cellular fluid. Other substances for the sample, which can be a biological or chemical sample, are possible. In principle, substances dissolved in the sample or undissolved components in the sample, for example impurities, can also be determined in this way.

Preferably the evaluation of the composition of the sample is used to establish whether there are haemolytic and/or lipaemic factors in the sample.

In this way, when using serum or plasma, it can be established whether the tests are affected by lipids, haemoglobin or bilirubin. Interferences at elevated quantities (lipids to 20 mg/ml, haemoglobin to 800 pg/ml, bilirubin to 200 pg/ml) may affect the reaction kinetics and distort the results. In the case of samples with lipaemic components the distortion is partly caused by the fats and/or lipids, which may contain cholesterol-rich components, swimming on the surface of the sample, being suctioned off using the pipette for volume determination instead of the serum or the plasma. This can lead to a distorted volume of the sample being determined and consequently interfere with or distort the analysis result. According to the invention, for this reason the composition of a sample is preferably performed at the surface as the fat and/or lipid-containing layers preferably separate at the surface. The composition of the sample is therefore preferably measured in the area of the upper interface line of the sample. According to the invention it is equally possible to perform a turbidimetric measurement straight through the sample. It is also possible in accordance with the invention to combine or carry out successively both measurement methods to determine the composition of a sample to achieve increased inspection reliability. In contrast to the interference and/or distortion of the measurement as a result of high-fat components of a sample, haemolytic components, if these are present in a sample, interfere with or influence the measurement firstly as a result of their red or brown colours and secondly by the fact that certain reactions are inhibited by haemolytic components. According to the invention it is therefore advisable to determine the composition of a sample before or alongside the inspection of the volume. According to the invention it is also possible to establish flocculation of the sample using one and/or both measurement methods for determining a composition of a sample. By more precisely inspecting the volume and the composition of a sample, a greater degree of inspection reliability is achieved, which in turn enables false-positive or false-negative samples to be more dependably excluded.

The recorded image is used to define a start point for a process step of the two samples that is downstream of the Inspection. In this way it is possible to drain the two samples, for example a blank sample or a comparison sample as the first sample and a sample to be analysed as the second sample, exactly under simultaneous conditions into the wells assigned to these samples which are separate to each other. For example, colour changes occurring at different points in time or occurring fluorescences can be evaluated in this way under simply comparable process conditions and at increased process speed as a result of a uniform time base, which is set by the time of recording as a time stamp. Each of the two pipettes can be calibrated such that when placing the marking at the same height as the respective interface line, there is a pre-determined volume of the first or second sample, which is limited by a tip of the respective pipette as well as by the first or second interface. By calibrating the pipette in each case in an area of the pipette that comprises the pipette tip, it is possible using just one recorded image to determine whether the first sample and/or the second sample feature(s) a predetermined volume. Provided the resolution and light sensitivity of the camera are adequate, it is also possible to record in sections, more than two pipettes with samples in one image at one time. The recorded image can be obtained, for example using an electronic matrix camera, in particular a CCD (Charge Coupled Device) or CMOS (Complementary Metal Oxide Semiconductor) camera. Another device for recording images is possible provided the resolution, focal distance, aperture, field of depth and sensitivity to light guarantee an image quality that is adequate for the evaluation.

In a preferred embodiment, the first fluid is formed as a gas bubble, in particular an air bubble. In the first pipette, this gas bubble is arranged between the first sample and a further fluid which is adjacent to the gas bubble, with a further interface formed between the further fluid and the gas bubble being optically perceptible outside of the pipette as a further interface line between the further fluid and the gas bubble that extends essentially horizontally. The gas bubble prevents an undesired mixing of the first sample with the further fluid. In this way in just one pipette, several liquids that need to be used or analysed can be drawn up and dispensed. For example both the first sample and the further fluid may be liquids which should be ejected successively into a single well or into different wells. The further fluid can also be used instead of a further sample as a dilution or comparison fluid for diluting the sample or for comparing with the sample. It has been shown that when recording an image with at least two interfaces, which can be formed in one and/or different pipettes, it is advantageous for a high image quality if the recorded image is composed of at least two partial images. For this purpose the first partial image comprises a first section of the first pipette, which includes a first tip of the first pipette and the first interface line and a second section of the second pipette with a second tip of the second pipette. A third section of the first pipette with the further interface line is reproduced on a second partial image. Breaking down apart the reproduction of the first interface line and the further interface line into the first pipette on the first partial image and the second partial image ensures that the gas bubble serves in a way as a "point of intersection" between the first partial image and the second partial image, with the two partial images preferably overlapping. As in the longitudinal direction of the pipette between the first interface line and the third interface line there is no further interface that could be evaluated, the section in the gas bubble between the first interface line and the third interface line is used as an edge of the first partial image. As in the first partial image the first interface line and in the second partial image the third interface line are reproduced, it can be determined in the combined recorded image under optimised camera-optical conditions for the first interface line and the third interface line whether the first interface line and the third interface line are at the same height as the (respective) marking. As in the combined image the second section of the second pipette and thereby potentially the second interface line that extends in the second pipette is reproduced, just one recorded image enables the volumes of three samples in two pipettes to be inspected. If there is a gas bubble not only in the first pipette but also in the second pipette such that the sample in this pipette can be drawn up into this pipette separately to a further fluid, using just one recorded image enables four fluids in two pipettes to be inspected in terms of their volume, with the first sample and the second sample being a fluid in each case. It particularly makes sense to compose the image of two partial images recorded separately with the camera, if the depth of field of the camera is not adequate to reproduce both the first interface line between the first sample and the gas bubble as well as the third interface line between the gas bubble and the third fluid in an adequate optical quality on the recorded image for evaluation.

An interface line reproduced in the first partial image and a further interface line reproduced in the second partial image in one or in different pipettes could advantageously always in principle be combined in one recorded image, if the Interface lines are spaced vertically from each other to such an extent that an optical parameter of the camera, for example its depth of field, resolution or image field range of consistent focal distance is no longer adequate to reproduce both interface lines so that they can be evaluated. For this reason in a further embodiment, the recorded image is composed of partial images recorded by the camera, in which on a first partial image a first section of the first pipette which incorporates a first tip of the first pipette and the first interface line and a second section of the second pipette with a second tip of the second pipette is reproduced and on the second partial image a fourth section of the second pipette with the second interface line is reproduced. In this way, in the combined image the second interface line in the second pipette reproduced in the second partial image can be applied to the tip of this pipette reproduced in the first partial image.

In the event that the pipettes are of conical form in the area of the pipette tip and the longitudinal axes of both pipettes are aligned in parallel and the tips of both pipettes are at the same height, it is also possible alternatively or additionally to the combined partial images, to align the pipettes to the lens of the camera so that the ends of the interface lines facing the lens in the first and/or second pipette, feature the same or similar distances to the lens. In this case it is not the longitudinal axes of the pipettes but the outer edges of the pipettes facing the lens that are essentially vertical to the optical axis of the lens or of the camera, and the ends of the interface lines facing the lens display the same or similar distances to a point of intersection of the optical axis with the lens-facing outer edge of the pipette, in which the respective interface line is arranged. The longitudinal axes of the pipettes can be rotated to the optical axis by half a cone angle in that the pipettes are rotated to the lens or the lens to the pipettes, for example by using a computerised electric motor. A recorded image composed of partial images and/or a rotation of the longitudinal axis of the pipette to the optical axis by half a cone angle is not only possible when recording an image of sections of two pipettes but also when recording one image of one pipette. Reference is made at this point to the disclosure in the parallel German patent application made by the applicant of this application with the file number DE 10 2011 117 310.6 and internal file number AES 80204, to the description pages 9, 10, 13, 21-24 and FIGS. 5 and 6, in which a recorded image composed of partial images and/or a rotation of the longitudinal axis of the pipette to the optical axis by half a cone angle of just one pipette is described and which is included as a disclosure in the present application by reference.

The first partial image and the second partial image can be recorded so that at least one of the first and second pipettes are moved relative to the image field of the camera. The first pipette and the second pipette can be a double pipette, also called a double pipetting module, in which the pipettes are aligned in terms of their longitudinal axes in parallel to each other and conical sections of the pipettes with the pipette tips are open in the same direction. Provided that the first pipette can be moved towards the second pipette in its longitudinal direction, the pipette tips can be aligned horizontally to each other towards the image field of the camera at the same height which makes subsequent evaluation easier once the image has been recorded. The double pipette can comprise separate drives for the first pipette and the second pipette for moving a fluid in the respective pipette. This ensures that the fluids in the first pipette and the second pipette are transferred at the same time to one or different wells. Instead of only two, more than two pipettes can also be combined in a multiple pipette, also called multiple pipetting module, said pipettes being aligned in terms of their longitudinal axes parallel to each other and with the conical sections of the pipettes with the pipette tips being open in the same direction and which each have separate drives for the simultaneous transfer of the fluids contained in the pipettes.

In the event that, for example, the first pipette and the second pipette are mounted on a joint holder, which can be moved towards the camera, the first pipette and the second pipette can be moved (together) through the image field of the camera. In this preferred embodiment the camera is arranged in a fixed location and the first pipette and the second pipette are arranged, for example, in a robot manipulator. Alternatively it is also possible that the first pipette and the second pipette are arranged in a fixed location and a camera is moved relative to the pipettes.

Preferably, the first partial image is shown overlapping the second partial image. This has the advantage that a contour of each pipette can be reproduced in the presentation of the two partial images so that they are overlapping, whereby the sections of the first pipette and the second pipette shown in the second partial image can be aligned with the tip of the first pipette and the tip of the second pipette shown in the first partial image. The tip of the first pipette and the tip of the second pipette can be used as geometric reference points to determine the volumes of fluids in the pipettes. Provided that the camera used for the image recording features a focal distance that can be adjusted automatically to the image conditions (autofocus), it can be ensured by recording the first partial image and the second partial image that the first, second and third interface lines are recorded at the optimum camera focus, so that the first partial image and the second partial image is each produced with adequate definition to ensure that a sufficiently accurate evaluation of whether the interface lines are at the same height as the marking. Reference is made at this point to the disclosure in the German patent application made by the applicant of this application with the file number DE 10 2011 117 310.6 and internal file number AES 80204, to the description pages 9, 13, 21-23 and FIGS. 5 and 6, in which a recorded image composed of partial images of just one pipette is described and which is included as a disclosure in the present application by reference.

As already explained above, the recorded image can be assigned a time stamp, which triggers a process step following the assignment of the time stamp, in particular a simultaneous ejection of the first sample from the first pipette and the second sample from the second pipette. When composing the recorded image of at least two partial images this time stamp can be assigned to the last recorded partial image. The process step following the assignment of the time stamp may include, colour changes of the first sample in a first well and the second sample in a second well to be evaluated at different points in time. Additionally or alternatively, following the recording of the recorded image the camera can be rotated or pivoted for recording a further image such that on the further image one or more wells in which the first sample and/or the second sample is/are arranged, can be reproduced. In this way the camera can not only be used for inspecting the volume of the first and/or second sample, but additionally or alternatively for determining a colour change of the first and/or second sample in one or several wells after ejecting the first and/or second sample out of the first and/or second pipette. In principle any camera with a marking in the image field of the camera can be used to carry out the described method(s) according to the invention. The camera used should feature a resolution, field of depth, aperture and light sensitivity that is adequate for evaluation.

A device according to the invention for inspecting a volume and a composition of a sample comprising a first pipette in which a first interface is formed between a first sample and a first fluid which is adjacent to the first sample, said interface being optically perceptible outside the pipette as a first interface line between the first sample and the first fluid that extends essentially horizontally; a camera with a marking which is arranged in an image field of the camera such that the marking and a first section of the first pipette are reproduced, with the pipette being arranged between a light source and the camera such that a spectrum of light beams of the light source can be recorded by the camera, said light beams having passed through the sample; and an evaluation unit which compares the marking in the recorded image with the position of the interface line and in which the evaluation unit comprises additional means which compare the recorded spectrum with a reference spectrum and determine whether the composition of the sample in accordance with the recorded spectrum corresponds to that of the reference spectrum.

A further embodiment of the device according to the invention for inspecting the volume and the composition of at least one sample comprises a first pipette, in which a first interface is formed between a first sample and a first fluid which is adjacent to the first sample, said interface being optically perceptible outside the pipette as a first interface line between the first sample and the first fluid that runs essentially horizontally; a second pipette, in which a second interface is formed between a second sample and a second fluid which is adjacent to the second sample, said interface being optically perceptible outside the second pipette as a second interface line between the second sample and the second fluid that extends essentially horizontally; a camera with a marking which is arranged in an image field of the camera such that the marking, a first section of the first pipette and a second section of the second pipette can be reproduced on a recorded image; and lastly an evaluation unit which can be used to evaluate whether the marking in the recorded image is at the same height as at least one of the first interface line in the first section and the second interface line in the second section. The embodiments of the method according to the invention apply to this device accordingly.

According to the invention it is further provided that the pipette is arranged between a light source and the camera such that a spectrum of light beams of the light source that have passed through the sample can be recorded by the camera. In this case the evaluation unit, which compares the marking in the recorded image with the position of the Interface line, comprises additional means which compare the recorded spectrum with a reference spectrum and determine whether, in accordance with the recorded spectrum, the composition of the sample corresponds to that of the reference spectrum.

For the device according to the invention for inspecting the volume and the composition of at least one sample, the pipette(s) can be arranged between a light source and the camera such that a spectrum of light beams of a light source can be recorded by the camera, said light beams having passed through a meniscus of the sample(s), which is formed at one edge of the interface to an inner wall of the pipette(s), and the evaluation unit can comprise additional means which compare the recorded spectrum/spectra with one/ several reference spectrum/reference spectra and determine whether the composition of the sample(s) in accordance with the recorded spectrum/spectra corresponds to that/those of the reference spectrum/reference spectra.

For the device according to the invention for inspecting the volume and the composition of at least one sample, the evaluation unit can comprise additional means which compare the recorded spectrum/spectra with one/several reference spectrum/reference spectra and determine whether haemolytic and/or lipaemic factors are present in the sample(s).

It is preferred that the marking on the recorded image is arranged between the first section of the first pipette and the second section of the second pipette. In this way, the distance between the marking and the outer end facing the marking of the first interface line that may be reproduced and the distance between the marking and the outer end facing the marking of the second interface line that may be reproduced is minimised. In this way the evaluation of whether the marking is at the same height as the first interface line, can be undertaken at the same or similarly high level of accuracy as the inspection of whether the marking is at the same height as the second interface line. In addition it is advantageous if the marking is arranged in a longitudinal direction of the axes of symmetry of both pipettes and additionally or alternatively arranged in a direction vertical to this longitudinal direction that is central or essentially central between the ends of the first and second interface lines facing the marking.

The first sample is advantageously the analysis sample and the second sample the comparison sample for comparing with the analysis sample. It is also possible for the second sample to be a blank sample.

Lastly, it is provided in the preferred embodiment that the device according to the invention is comprised of an analyser for analysing biological or chemical samples using a reagent liquid added via a pipette. As the analyser, for example, the device described in DE 10 2008 022 835 B3 or one of the devices described respectively in the parallel German patent applications made by the applicant of this application with the file number DE 10 2011 117 311.4 and the internal file number AES 80205 and the file number DE 10 2011 117 320.3 and the internal file number AES 80206 are possible, which are included as a disclosure in the present application by reference.

The device according to the invention and/or the analyser according to the invention and/or the method according to the invention can be used to record one or more wells, for example of a microtitre plate in a further image and to evaluate the further recorded image information, for example, one or more colour changes of one or more samples in one or more wells. The image can be recorded according to the invention by rotating or pivoting the camera away after recording the recorded image of the sections of the pipette, for example by essentially 90 degrees in the direction of the well or wells. In one embodiment the camera is directed vertically at the pipettes for recording the image of the sections of the pipette and after recording this image it is directed horizontally at one or more wells arranged beneath the camera. Corresponding devices and methods for recording the image and evaluating a recorded image of one or more wells or one or more samples, which are retained in one or more wells, for which the device according to the Invention and/or the analyser according to the invention and/or the method according to the invention can be used, are described in the parallel German patent applications of the applicant of the present application with the file reference DE 10 2011 117 311.4 with the internal file reference AES 80205 and DE 10 2011 117 320.3 with the internal file reference AES 80206, which are included as a disclosure in the present application by reference in each case.

Further exemplary embodiments and advantages of the invention are explained in the following on the basis of the figures. For greater clarity, the FIGS. 3 to 5 are not shown true to scale or proportion. FIGS. 1 and 2 are shown true to scale. Unless specified otherwise, in the figures the same references refer to the same parts with the same meaning.

DETAILED DESCRIPTION OF THE INVENTION

Figure 1:
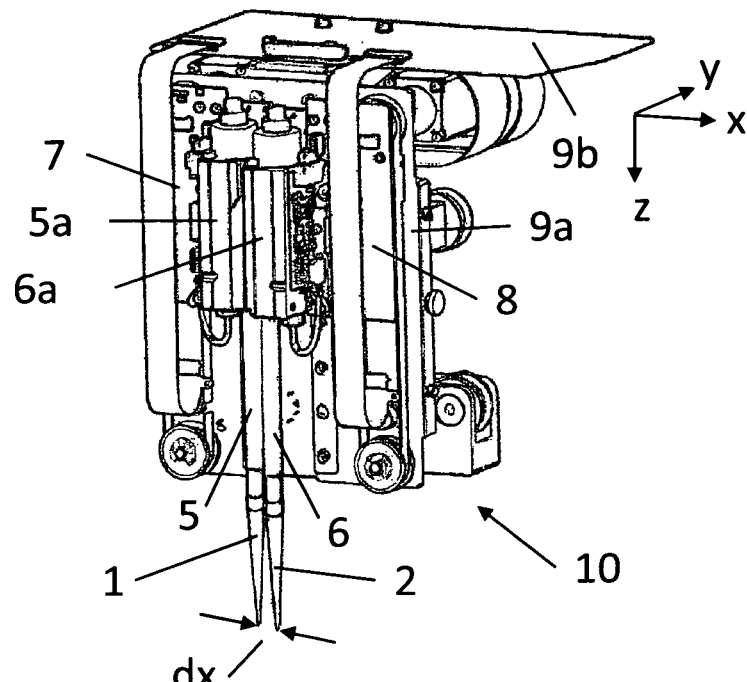
FIG. 1 shows a three-dimensional schematic diagram of a double pipetting module.

FIG. 1 shows a schematic diagram of a double pipetting module 10 with a first pipette 1 and a second pipette 2, the tips of which feature a distance dx away from each other in the x direction. The pipette 1 is retained by a first pipette holder 5 and the pipette 2 by a second pipette holder 6, in which the pipette holders 5, 6 and the pipettes 1, 2 are aligned to each other in parallel in a z direction which corresponds to the longitudinal direction of each of the two pipettes 1, 2. The first pipette holder 5 of the first pipette 1 is attached via a first retaining element 5a on a first retaining plate 7. Correspondingly, the second pipette holder 6 of the second pipette 2 is attached using a second retaining element 6a on a second retaining plate 8. The first retaining plate 7 and the second retaining plate 8 are arranged together on a support plate 9a, in which the first retaining plate 7 for retaining the first pipette 1 and the second retaining plate 8 for retaining the second pipette 2 can be moved against each other and towards the support plate 9 in a z direction. The support plate 9a is attached to a base support 9b which can be moved in the x direction and/or y direction. The double pipetting module shown in FIG. 1 can be designed as part of a robot manipulator. As a result of the mobility of the base support 9b in the x and/or y direction and mobility of the pipettes 1, 2 in the z direction, the pipettes 1, 2 can be moved in any three directions in a restricted area. For example the double pipetting module 10 can be designed so that it can move between a camera and an empty pipette reservoir. The travelling movements of the double pipetting module 10 can be controlled using a computer or PC.

The pipette module 10 is equipped with a drive for moving a fluid within the first pipette 1 relative to the first pipette 1 and with a further drive for moving a further fluid within the second pipette 2 relative to the second pipette 2. Using these drives a fluid, in particular in liquid form, is added to or discharged from the pipettes 1, 2. As a result of the separate drives for the pipettes 1, 2, the volumes of the fluids contained in the pipettes 1, 2, the push and/or pull parameters, the drive speeds etc. can be set and controlled and/or regulated individually for each of the two pipettes 1, 2. In particular, a fluid in the first pipette 1, for example in the form of a sample liquid, and a further fluid in the second pipette 2, for example a reagent liquid, can be transferred at the same time to wells (not shown) which are arranged beneath the pipettes in the z direction, with there being no or virtually no delay when transferring the liquids between the transfer of the first pipette 1 and the transfer of the second pipette 2 and the sample fluid is not mixed with the control liquid. In addition, with separate drives for the first pipette 1 and for the second pipette 2, there can be different fluidic parameters of the fluids in the first pipette 1 and the second pipette 2 for the fluids contained in the pipettes and yet the liquid of the first pipette 1 and the second pipette 2 will be transferred at the same time.

Figure 2:
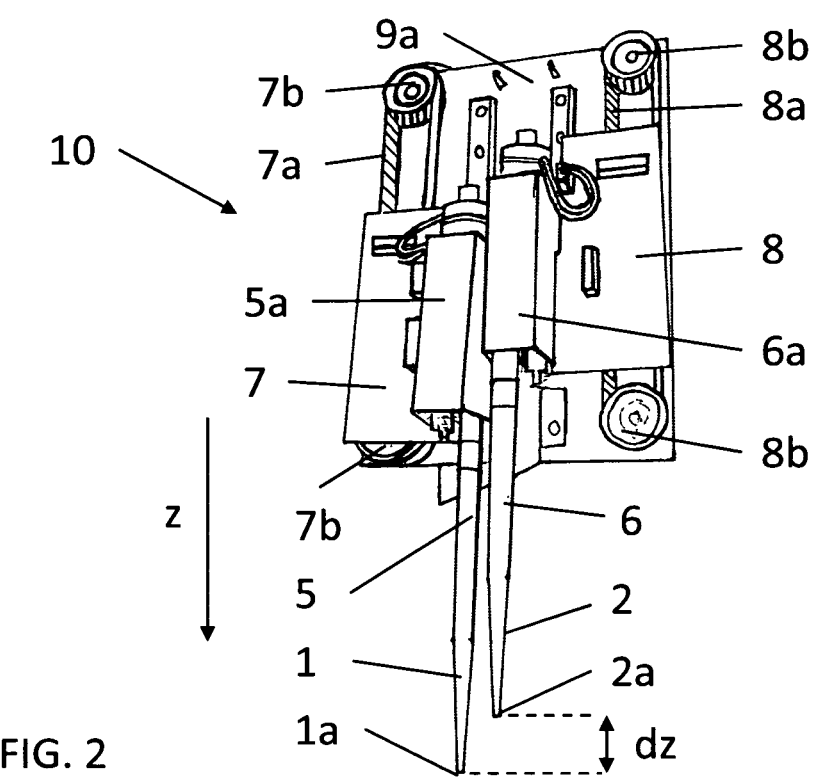
FIG. 2 shows a further three-dimensional diagram of a double pipetting module with pipettes which are offset against each other in a longitudinal direction of both pipettes.

FIG. 2 shows a further double pipetting module 10 with pipettes 1, 2 moved against each other in the z direction. A first pipette tip 1a of the first pipette 1 is moved in the z direction to a second pipette tip 2a of the second pipette 2 by the value/amount dz. Moving the pipettes is achieved by designing the first retaining place 7 as a slide and fixing it to a belt 7a, which can be moved in the z direction towards the base plate 9a. For this purpose belt pulleys 7b are attached to an upper and lower end of the support plate 9a in the z direction, with one or both of the belt pulleys 7b being driven by a motor, for example an electric motor. Correspondingly, the second pipette 2 can be moved via belt pulleys 8b in the z direction by means of a belt 8a that can be moved towards the base plate 9a, to which the second retaining plate 8 with the second pipette holder 6 is attached. The double pipetting modules shown in FIGS. 1 and 2 enable a precise and cost-effective positioning of the pipettes 1, 2 with minimised installation space and with the possibility of automation. When required the double pipetting modules 10 shown in FIGS. 1 and 2 can be expanded to include further pipettes (not shown) and corresponding elements for their positioning. Consequently the double pipetting module 10 may, for example, feature five or ten pipettes, with there being a corresponding number of pipette holders, retaining elements and retaining plates per pipetting module, which are arranged on a common support plate 9a. For more than two pipettes per module, a multiple pipetting module should be referred to instead of a double pipetting module.

Figure 3:
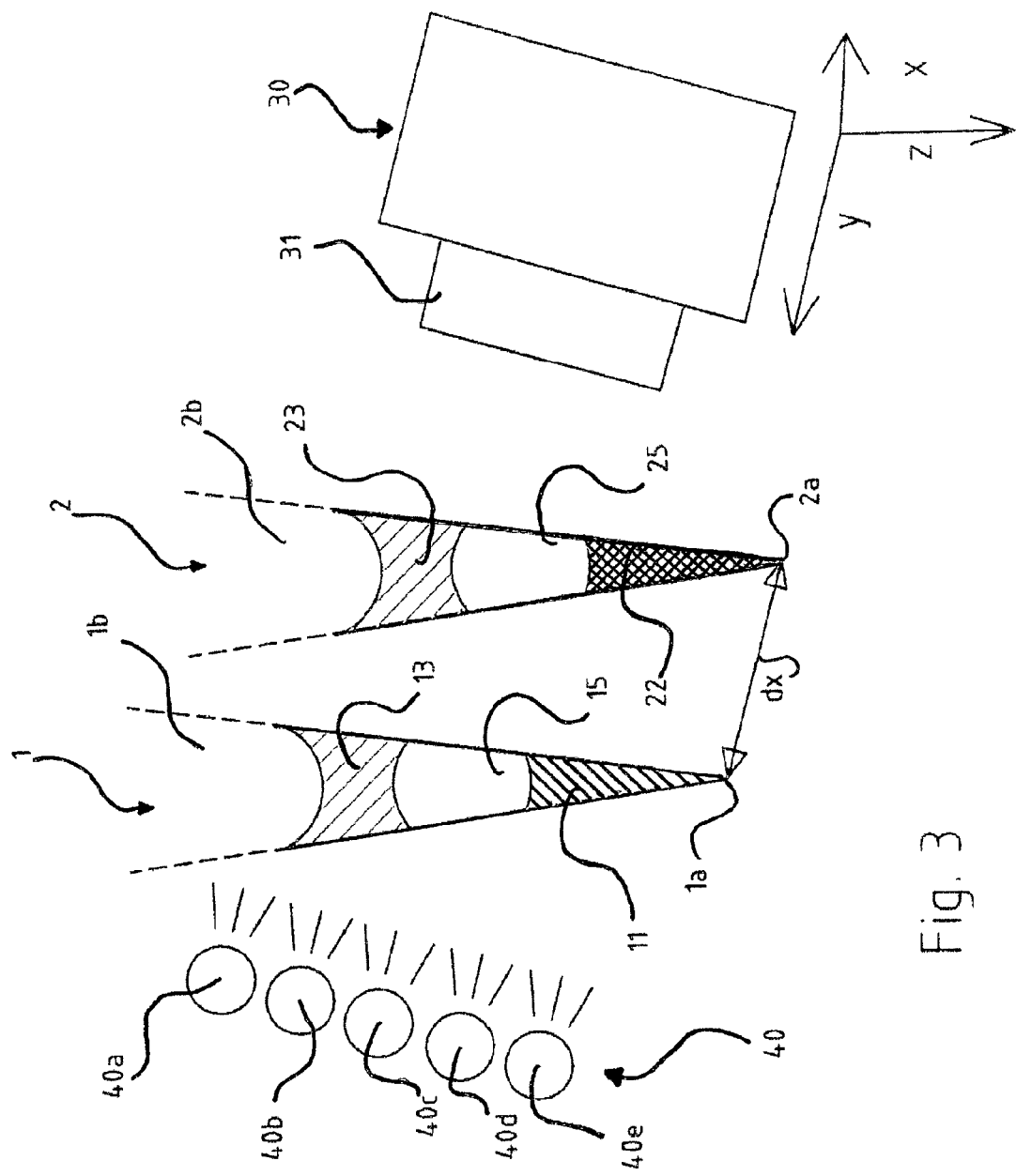
FIG. 3 shows an arrangement according to the invention of two pipettes, which are arranged between a light source and a camera.

FIG. 3 shows an arrangement according to the invention of a first pipette 1 and a second pipette 2 in perspective, which are arranged in the y direction between a light source 40 and a camera 30 with a lens 31. The first pipette 1 comprises a first section with a first tip 1a and the second pipette 2 comprises a second section with a second tip 2a. The pipettes 1, 2 are aligned in parallel to each other in the z direction, in which the first tip 1a of the first pipette 1 and the second tip 2a of the second pipette 2 are at the same or comparable height in the z direction. In the x direction, which corresponds in FIG. 3 to a direction in the plane of the sheet, the tips 1a, 2a of the pipettes 1, 2 are arranged at a distance dx from each other. The y direction corresponds to the optical axis of the camera 30 and in particular the lens 31 of the camera 30. Several point or virtually point light sources 40a to 40e are used as the light source 40. Possible light sources are, for example, LED, gas discharge, laser light sources and/or conventional halogen lamps. Instead of several point or virtually point light sources, a surface light can also be used to ensure an ambient brightness over a required section of the pipettes 1, 2 in the z direction that is adequate for image recording. In the first pipette 1 a first sample 11 is drawn up, which extends to the tip 1a of the first sample 1, with the first sample 11 being separated from a third fluid 13 by a first fluid 15 in the form of a gas bubble, which can be formed particularly as an air bubble. In a similar way, a second sample 22 in the second pipette 2 is separated from a further fluid 23 by a second fluid 25, which as the first fluid 15 can be in the form of a gas bubble, in particular an air bubble. FIG. 3 shows the first sample 11 and the second sample 22 as blood and/or serum and/or cellular fluid. Other substances are possible for the first sample and the second sample, which in each case can be biological or chemical samples. The first sample and the second sample, which are fluids, form menisci as curved interfaces in each case to the first fluid 15 and the second fluid 25 in pipette 1 and in pipette 2. These are produced when the first sample 11 which is present as a liquid, is adjacent to the first fluid 15 which is present as a gas. As the third fluid 13 is also present in liquid form and forms an interface to the gas bubble of the first fluid 15, the first sample 11 is separated from the third fluid 13 by the gas bubble of the first fluid so that there is no mixing between the first sample 11 and the third fluid 13. Correspondingly the second sample 22 is separated by the gas bubble of the second fluid 25 from the further fluid 23 so that mixing of the second sample 22 with the further fluid 23 is excluded. The first pipette 1 features a conical form with the tip 1a and an end 1b that is open in the direction opposite to the z direction. Correspondingly the second pipette 2 with the tip 2a features an end 2b open in the direction opposite to the z direction.

Figure 4:
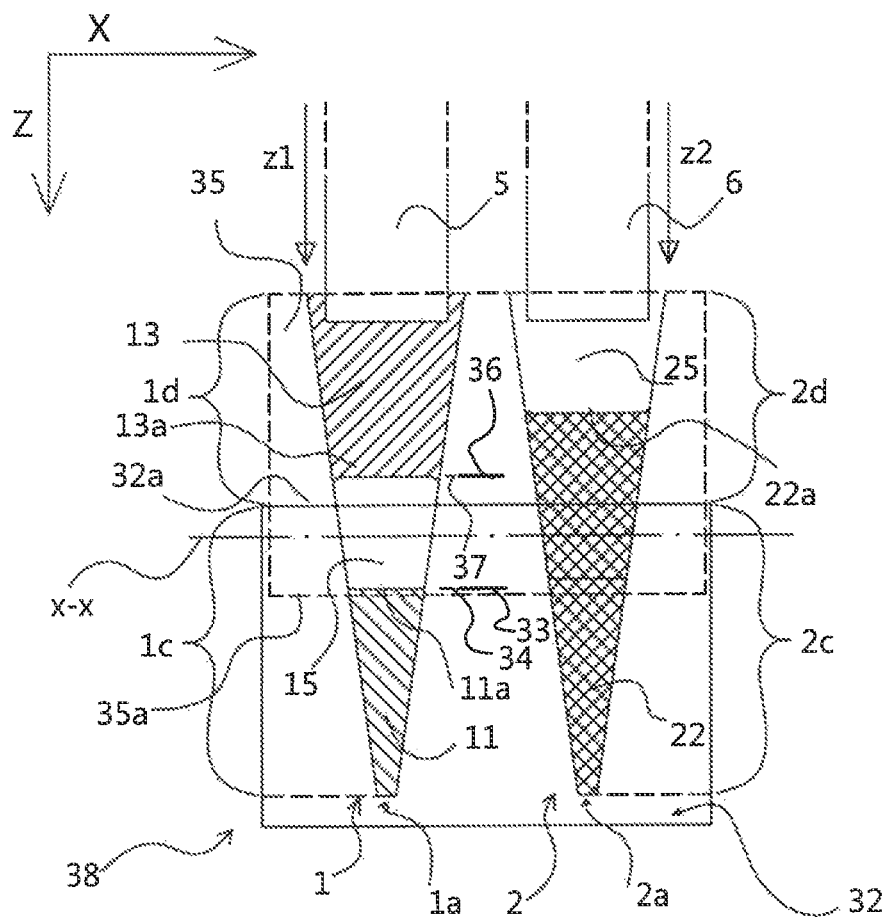
FIG. 4 shows a schematic diagram of an image composed of two partial images of two pipettes filled with fluids.

FIG. 4 shows a recorded image 38 of the camera 30 of the first pipette 1 and the second pipette 2 in which in the direction opposite to the z direction, the first pipette 1 is connected to the first pipette holder 5 and the second pipette 2 is connected to the second pipette holder 6. The pipette 1 can be moved in a z1 direction and the second pipette 2 in a z2 direction, so that the first pipette 1 can travel to the second pipette 2 and both pipettes can travel in the z direction or In the direction opposite to the z direction. The first pipette 1 comprises the sample 11, which forms an interface to the first fluid 15 in the form of a gas bubble, said interface being optically perceptible outside the pipette 1 as an essentially horizontal interface line 11a. The Interface line 11a is curved as a result of a concave meniscus in the direction opposite to the z direction at one edge of the first pipette 1, so that it is advantageously at the same height in the z direction as a marking 33 of the camera 30 in the image field of the camera 30, if the marking 33 in the form of an inspection line is at the same height in the z direction as a first line 34 of the underside of the meniscus (shown dashed). In the first pipette 1, the third fluid 13 is also drawn up so that a third interface 13a forms to the first fluid 15 which is present as a gas bubble, said interface being optically perceptible outside the pipette as an essentially horizontal interface line 13a. As the third fluid 13 is present in liquid form and the first fluid is present in gaseous form, the third fluid forms a convex meniscus to the first fluid so that in comparison with a further marking 36, which is an inspection line like marking 33, a second line 37 of the upper side of the convex meniscus is used to determine whether the third interface line 13a of the third fluid 13 is at the same height as the further marking 36. In the pipette 2, the fluid 22 is drawn up as a second sample, which forms an interface to the second fluid 25, said interface appearing outside of the second pipette 2 as an interface line 22a that is aligned essentially horizontally. As shown in FIG. 4, on a recorded image 38 composed of the partial images 32, 35, both the marking 33 and the first interface line 11a, the second interface line 22a and the third interface line 13a are reproduced. By evaluating whether in the recorded image 38 the marking 33 is at the same height as at least one of the first to third interface lines 11a, 13a, 22a, the volumes of the first sample 11, the second sample 22 and the first fluid 15 can be inspected. It is particularly easy in the event that the first sample 15 extends to the first tip 1a of the first pipette 1 and the second sample 22 extends to the second tip 2a of the second pipette 2. In this case a distance determined using the recorded image of the marking 33 in the z direction to the first tip 1a of the first pipette 1 and/or to the second tip 2a of the second pipette 2 can be used to determine the volumes of the first sample 11 and/or the second sample 22 and/or the first fluid. In this respect the tips 1a, 2a of the first pipette 1 and the second pipette 2 are used as reference points to establish an absolute distance of the first tip 1a of the first pipette 1 to the first interface line 11a and to the third interface line 13a and of the second pipette 2 to the second interface line 22a when a recorded image is available. If the first pipette 1 and/or the second pipette 2 is calibrated such that when the marking 33 is placed at the same height as the first interface line 11a and/or the second interface line 22a, there is a pre-defined volume of the first sample 11 and/or the second sample 22, it is possible to determine with just one recorded image 38, whether a volume of the first sample 11 and/or the second sample 22 is at the pre-defined level. Insofar as no interface line is reproduced in the recorded image 38, recorded sections 1c, 1d, 2c, 2d can be used to evaluate whether in the first pipette 1 the first sample 11 and/or in the second pipette 2 the second sample 22 is drawn up.

When orienting the longitudinal direction of the first pipette 1 in the z direction and orienting the optical axis of the lens 31 of the camera 30 in the y direction, the Interface line 11a which is perceptible by the camera features a greater distance to lens 31 than the third interface line 13a that is perceptible by the camera 30 as a result of the conical form of the first pipette 1. In the event, for example, of an inadequate depth of field of the camera 30, one of the first 11a, second 22a and third 13a interface lines or even two of these interface lines may be unfocused on the recorded image compared with one of the interface lines. An unfocused reproduction of the first interface line 11a and/or the third interface line 13a, can make it more difficult or even impossible to evaluate whether the marking 33 is at the same height as the first interface line 11a and/or third interface line 13a.

An increased image quality of the recorded image 38 can be achieved if, instead of one recorded image, two partial images 32, 35 are recorded from which the recorded image 38 is composed. On a first partial image 32 a first section 1c of the first pipette 1 is reproduced, which includes the tip 1a of the first pipette 1 and the first interface line 11a. In addition to section 1c the first partial image 32 comprises in the x direction a further section 2c of the second pipette 2 with the second tip 2a of the second pipette 2. On the second partial image 35, a third section 1d of the first pipette 1 with the third interface line 13a is reproduced. In addition the second partial image in the embodiment shown in FIG. 4 comprises a section 2d of the second pipette with the second interface line 22a. When aligning the first tip 1a of the pipette 1 and the second tip 2a of the pipette 2 in the x direction, i.e. at the same height in the z direction, to divide the recorded image 38 into the first partial image 32 and the second partial image 35, an axis x-x through the section of the first pipette that can be detected by the camera can be set, said pipette being filled with the first fluid 15. The axis x-x divides the first pipette 1 into an upper section 1d with the third interface line 13a and a lower section 1c in the z direction with the first interface line 11a. The recording of the first partial image 32 thereby ensures that the first interface line 11a lies in the focal point of the camera 30 and/or in the field of depth range of the camera 30 such that a reliable evaluation can be made as to whether the first interface line 11a is at the same height as the marking 33, as a result of a sufficiently high image quality. Correspondingly it is ensured that for the second partial image 35 the third interface line 13a lies in the focal point of the camera 30 or at least in its depth of field range such that an evaluation can be made as to whether the third interface line 13a is at the same height as the marking 36, as a result of an adequate reproduction quality with high process stability. As shown in FIG. 4, it can also be ensured that for the second partial image 35, the second interface line 22a lies in the focal point of the camera 30 or at least in its depth of field range for an image quality that is adequate for evaluation.

The first partial image 32 can overlap with the second partial image 35 when combining both images 32, 35. In this process a lower edge 35a of the first partial image 35 is arranged in the z direction beneath an upper edge 32a of the first partial image 32 in a direction opposite to the z direction. For this reason the first interface line 11a is reproduced on the second partial image 35 as on the first partial image 32. As a result of the overlapping contour of the first pipette 1 caused by overlapping the first partial image 32 and the second partial image 35, the second partial image 35 can be aligned in terms of the first tip 1a of the first pipette 1. The second partial image 35 is also used to align the second partial image 35 to the second tip 2a of the second pipette 2 based on the contour of the second pipette 2. For calibrated pipettes, the volume of the first sample 11, the second sample 22 and the third fluid 13 can be deduced from the distance of the first interface line 11a, the second interface line 22a and/or the third interface line 13a to the tip 1a and/or to the tip 2a. A time stamp can be assigned to the recorded image 38, for example of the time of recording the second partial image 35. As a result of this time stamp, a process step following the recording of the second image can be triggered. For example, the first sample 11 and the third fluid 13 can be virtually simultaneously ejected out of the pipettes 1, 2 into a well and the second sample 22 in a further well (not shown), for example using a double pipetting module 10.

Figure 5:
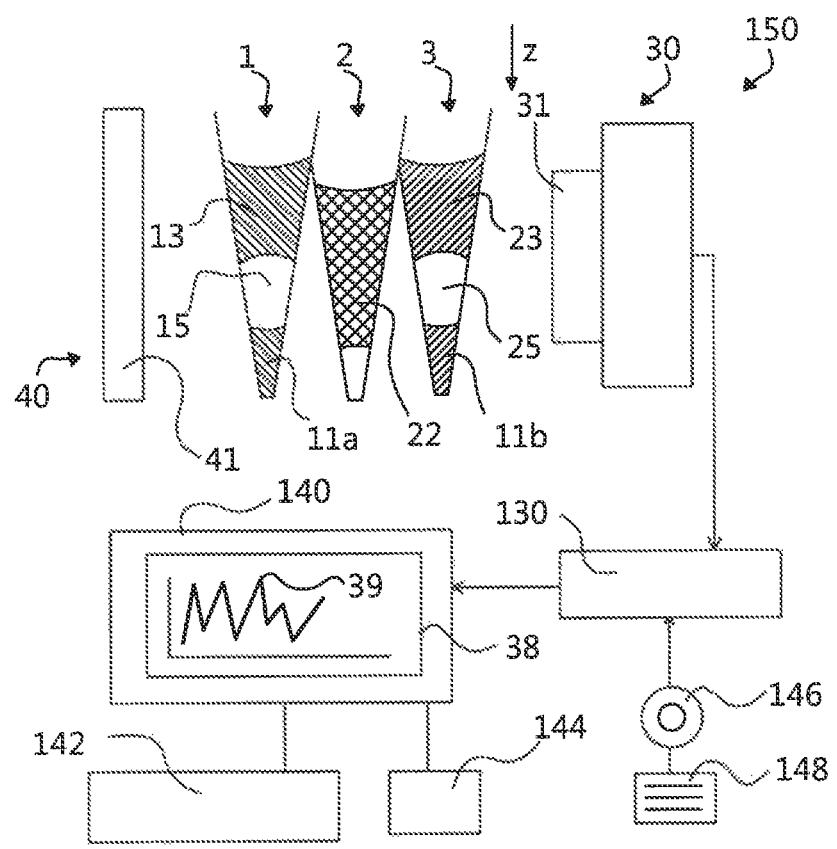
FIG. 5 shows the device according to the invention in which three pipettes are arranged between a light source and a camera.

FIG. 5 shows the device according to the invention in the form of three pipettes 1, 2, 3, which are arranged between the light source 40 and the camera 30 with the lens 31. Instead of several point light sources or quasi-point light sources 40a to 40e in FIG. 3, in FIG. 5 a surface light 41 is used as a light source 40. The first pipette comprises the first sample 11, the first fluid 15 and the third fluid 13, as shown in FIGS. 3 and 4. The second pipette 2 comprises the sample 22, in which this sample does not extend to the tip of the second pipette 2. In the embodiment shown in FIG. 5, a third pipette 3 is shown on the recorded image 38, said pipette comprising the first sample 11, the second fluid 25 arranged above this and a further fluid 23 arranged above this in the direction opposite to the z direction. In the event of adequate illumination from the surface light 41 and adequate resolution of the camera 30, the volume of several fluids 11, 13, 15, 22, 23, 25 in one or in several pipettes can thereby be inspected. The image 38 recorded by the camera 30, on which the pipettes 1, 2, 3 are shown in sections, is sent to a computer acting as an evaluation unit 130, which presents the image information contained in the image 38 on a monitor 140. The evaluation unit 130 can be controlled using a keyboard 142 and/or a mouse 144. In addition to presenting the pipettes 1, 2, 3 the evaluation unit also evaluates whether in the recorded image 38 the marking 33 is at the same height as at least one of the first 11a and second 22a and third 13a interface lines. This information can be presented in tabular form, as binary information for further processing in a further evaluation instrument connected to the evaluation unit 130, or graphically in the form of a function 39 or relationship. Suitable software that can be run on the evaluation unit 130 or a computer program 148 which can, for example be stored on a CD or DVD 146 as a data storage device, is used to evaluate whether in the recorded image 38 the marking 33 is at the same height as at least one of the first 11a or second 22a interface lines. This evaluation can, for example, be made by comparing the brightness distributions of the recorded image 38 with corresponding brightness distributions of reference images. The computer program product 148 for the evaluation unit 130 of the device 150 for inspecting the volumes of at least two samples is therefore used as the data storage device 146 with the computer program product 148 stored on it, to carry out the method according to the invention.

What is claimed is:
1. A method for inspecting a volume and a composition of at least first fluid sample (11), said method comprising:
  (a) providing a pipette (1), in which at least one interface is formed between the at least one sample (11) and at least a first fluid (15) which is adjacent to the first sample (11), said interface being optically perceptible outside the pipette (1) in the first case as an about horizontal interface line (11a) between the at least one sample (11) and the at least first fluid (15);
  (b) arranging at least one marking (33) of a camera (30) in an image field of the camera (30), such that the at least one marking (33) and at least a first section (1c, 1d) of the at least one pipette (1) are reproduced on a recorded image (38), with the at least one pipette (1) being arranged between a light source (20, 20a-20e) and the camera (30) such that at least one spectrum (13) of light beams (22-24) of the light source (20, 20a-20e) that have passed through the first sample (11) can be recorded by the camera (30);
  (c) evaluating whether the at least one marking (33) in the recorded image (38) matches a position of at least one interface line (11a) in the at least first section (1c, 1d);
  (d) comparing a first recorded spectrum (13) with at least one reference spectrum; and
  (e) determining whether the composition of the at least one first sample (11) in accordance with the at least one recorded spectrum (13) corresponds to that of the at least one reference spectrum.
2. The method according to claim 1, further comprising:
  (a) providing a second pipette (2), in which at least one second interface is formed between the at least one second, fluid sample (22) and a second fluid (25) which is adjacent to the second sample (22), said interface being optically perceptible outside the at least second pipette (2) in a second case as an at least second about horizontal interface line (22a) between the at least second sample (22) and the second fluid (25);
  (b) arranging the at least one marking (33) of a camera (30) in an image field of the camera (30), such that the at least one marking (33), at least one section (1c, 1d) of the at least one pipette (1) and a second section (2c, 2d) of the at least second pipette (2) are reproduced on a recorded image (38), with pipettes (1, 2) being arranged between a light source (20, 20a-20e) and the camera (30) such that at least one spectrum (13) of light beams (22-24) of the light source (20, 20a-20e) that have passed through a first samples (11), and a second sample (22) can be recorded by the camera (10);
  (c) evaluating whether the at least one marking (33) in the recorded image (38) matches the position at least of the first of the at least one interface line (11a) in the at least first section (1c, 1d) and the at least second interface line (22a) in the second section (2c, 2d),
  (d) comparing a recorded spectra (13) in each case with reference spectra; and

(e) determining whether the composition of the first and second samples (11, 22) in accordance with the recorded spectra (13) corresponds to those of the reference spectra.

3. The method according to claim 1, wherein at least one recorded spectrum (13) is compared with at least one reference spectrum, to determine whether haemolytic and lipaemic factors are present in at least one sample (11, 22).

4. The method according to claim 2, wherein at least one recorded spectrum (13) is compared with at least one reference spectrum to determine whether haemolytic and lipaemic factors are present in at least first sample (11), and the at least second sample (22).

5. The method according to claim 1, wherein (a) a pipette(s) (1, 2) is/are arranged between a light source (20, 20a-20e) and the camera (10) such that in a first case a spectrum (13) of light beams (22-24) of the light source (20, 20a-20e) is recorded by the camera (10), said light beams having passed through at least one meniscus of the first sample (11), and the at least second sample (22), said meniscus/menisci being formed at least one edge of the interface to an inner wall of the pipette(s) (1, 2);
(b) at least one recorded spectrum (13) is compared with at least one reference spectrum; and
(c) it is determined whether the composition of the at least first and second sample (11, 22) in accordance with the at least one recorded spectrum (13) corresponds to that of at least one reference spectrum.

6. The method according to claim 2, wherein
(a) the pipette(s) (1, 2) is/are arranged between a light source (20, 20a-20e) and the camera (10) such that in a first case a spectrum (13) of light beams (22-24) of the light source (20, 20a-20e) is recorded by the camera (10), said light beams having passed through at least one meniscus of the sample(s) (11, 22), said meniscus/menisci being formed at at least one edge of the interface to an inner wall of the pipette(s) (1, 2);
(b) at least one recorded spectrum (13) is compared with at least one reference spectrum; and
(c) it is determined whether the composition of the at least the first and second sample (11, 22) in accordance with the at least one recorded spectrum (13) corresponds to that of at least one reference spectrum.

7. The method according to claim 2, wherein
(a) the first fluid (15) is formed as a gas bubble, such as an air bubble;
(b) in at least one pipette (1), in at least two pipettes (1, 2), the gas bubble is arranged between a sample (11) and a further fluid (13) which is adjacent to the gas bubble, with a further interface formed between the further fluid (13) and the gas bubble being optically perceptible outside the pipette (1) as a further interface line (13a) between the further fluid (13) and the gas bubble that extends about horizontally;
(c) the recorded image (38) is composed of partial images (32, 35) recorded by the camera (30), wherein (i) on a first partial image (32) a first section (1c) of the first pipette (1) is reproduced, which includes a first tip (1a) of the first pipette (1) and the first interface line (11a), and a second section (2c) of the second pipette (2) with a second tip (2a) of the second pipette (2) is reproduced;
(ii) on a second partial image (35), a third section (1d, 2d) of at least one pipette (1) with the further interface line (13a) is reproduced; and
(iii) both partial images preferably overlap.

8. The method according to claim 2, wherein the recorded image (38) is composed of partial images (32, 35) recorded by the camera (30), in which
(i) on a first partial image (32) a first section (1c) of the first pipette (1) is reproduced, which includes a first tip (1a) of the first pipette (1) and the first interface line (11a), and a second section (2c) of the second pipette (2) with a second tip (2a) of the second pipette (2) is reproduced; and
(ii) on the second partial image (35), a fourth section (2d) of the second pipette (1) with the second interface line (22a) is reproduced.

9. The method according to claim 2, wherein the camera (30) is arranged in a fixed location and the first pipette (1) and the second pipette (2) are moved through the image field of the camera (30).

10. The method according to claim 3, wherein the camera (30) is arranged in a fixed location and the first pipette (1) and the second pipette (2) are moved through the image field of the camera (30).

11. The method according to claim 4 wherein the camera (30) is arranged in a fixed location and the first pipette (1) and the second pipette (2) are moved through the image field of the camera (30).

12. The method according to claim 5, wherein the camera (30) is arranged in a fixed location and the first pipette (1) and the second pipette (2) are moved through the image field of the camera (30).

13. The method according to claim 6, wherein the camera (30) is arranged in a fixed location and the first pipette (1) and the second pipette (2) are moved through the image field of the camera (30).

14. The method according to claim 7, wherein the camera (30) is arranged in a fixed location and the first pipette (1) and the second pipette (2) are moved through the image field of the camera (30).

15. The method according to claim 8, wherein the camera (30) is arranged in a fixed location and the first pipette (1) and the second pipette (2) are moved through the image field of the camera (30).

16. The method according to claim 2, wherein a first partial image (32) and a second partial image (35) are shown overlapping.

17. The method according to claim 16, wherein a time stamp is assigned to the recorded image (38), which triggers a process step following the assignment of the time stamp, in a way that a simultaneous ejection of the first sample (11) out of the first pipette (1) and the second sample (22) out of the second pipette (2) takes place.

18. A device (150) for inspecting a volume and composition of at least one sample (11), said device comprising:
(a) a first pipette (1), in which a first interface is formed between a first sample (11) and a first fluid (15) which is adjacent to the first sample (11), said interface being optically perceptible outside pipette (1) as a first interface line (11a) between the first sample (11) and the first fluid (15) that extends about horizontally;
(b) a camera (30) with a marking (33), which is arranged in an image field of the camera (30), such that the marking (33) and a first section (1c, 1d) of the first pipette (1) can be reproduced, with pipette (1) being arranged between a light source (20, 20a-20e) and the camera (10) such that a spectrum (13) of light beams (22-24) of the light source (20, 20a-20e) that have passed through the first sample (11) can be recorded by the camera (10); and (c) an evaluation unit such as a computer or PC (130), which compares the marking (33) in a recorded image with a position of the interface line (11*a*) and in which said evaluation unit (130) comprises additional devices such as software or hardware which compare a recorded spectrum (13) with a reference spectrum and determine whether the composition of the first sample (11) in accordance with a recorded spectrum (13) corresponds to that of the reference spectrum.

19. The device according to claim 18, additionally comprising:
    (a) a second pipette (2), in which a second interface is formed between a second sample (22) and a second fluid (25) which is adjacent to the second sample (22), said interface being optically perceptible outside the second pipette (2) as a second interface line (22*a*) between the second sample (22) and the second fluid (25) that extends about horizontally;
    (b) a camera (30) with the marking (33), which is arranged in an image field of the camera (30), such that the marking (33), a first section (1*c*, 1*d*) of the first pipette (1) and a second section (2*c*, 2*d*) of the second pipette (2) are reproduced on a recorded image (38), with the pipettes (1, 2) being arranged between a light source (20, 20*a*-20*e*) and the camera (30), such that a spectrum (13) of light beams (22-24) of the light source (20, 20*a*-20*e*) that have passed through a first and a second samples (11, 22) can be recorded by the camera (30); and
    (c) an evaluation unit (130), which compares the marking (33) in a recorded image (38) with the position at least one of the first interface line (11*a*) in the first section (1*c*, 1*d*) and the second interface line (22*a*) in the second section (2*c*, 2*d*) and in which the evaluation unit (130) comprises additional means which compare the recorded spectra (13) with reference spectra and determine whether the composition of the first or second samples (11, 22) in accordance with the recorded spectra (13) correspond to those of the reference spectra.

20. The device (150) according to claim 18, in which the pipette(s) (11, 22) is/are arranged between a light source (20, 20*a*-20*e*) and the camera (30) such that a spectrum (13) of light beams (22-24) of the light source (20, 20*a*-20*e*) can be recorded by the camera (30), said light beams having passed through a meniscus of the first and second (11, 22), which is formed at one edge of the interface to an inner wall of the pipette(s) (1, 2), and the evaluation unit (130) comprises additional means, which compare the recorded spectrum/spectra (13) with a/several reference spectrum/reference spectra and determine whether the composition of the first and second sample(s) (11, 22) in accordance with the recorded spectrum/spectra (13) corresponds to that/those of the reference spectrum/reference spectra.

21. The device (150) according to claim 19, in which the pipette(s) (11, 22) is/are arranged between a light source (20, 20*a*-20*e*) and the camera (30) such that a spectrum (13) of light beams (22-24) of the light source (20, 20*a*-20*e*) can be recorded by the camera (30), said light beams having passed through a meniscus of the first and second sample(s) (11, 22), which is formed at one edge of the interface to an inner wall of the pipette(s) (1, 2), and the evaluation unit (130) comprises additional means, which compare the recorded spectrum/spectra (13) with a/several reference spectrum/reference spectra and determine whether the composition of the first and second sample(s) (11, 22) in accordance with the recorded spectrum/spectra (13) corresponds to that/those of the reference spectrum/reference spectra.

22. The device (150) according to claim 18, wherein the evaluation unit (130) comprises additional means to compare the recorded spectrum/spectra (13) with one/several reference spectrum/spectra and determine whether haemolytic and lipaemic factors are present in first and second the sample(s) (11, 22).

23. The device (150) according to claim 19, wherein the evaluation unit (130) comprises additional means to compare the recorded spectrum/spectra (13) with one/several reference spectrum/spectra and determine whether haemolytic and lipaemic factors are present in the sample(s) (11, 22).

24. An analyser for analysing biological or chemical samples (11, 22) by means of a reagent liquid added using a pipette with a device (150) according to claim 18.

25. An analyser for analysing biological or chemical samples (11, 22) by means of a reagent liquid added using a pipette with a device (150) according to claim 19.

26. An analyser for analysing biological or chemical samples (11, 22) by means of a reagent liquid added using a pipette with a device (150) according to claim 20.

27. An analyser for analysing biological or chemical samples (11, 22) by means of a reagent liquid added using a pipette with a device (150) according to claim 21.

28. An analyser for analysing biological or chemical samples (11, 22) by means of a reagent liquid added using a pipette with a device (150) according to claim 22.

29. An analyser for analysing biological or chemical samples (11, 22) by means of a reagent liquid added using a pipette with a device (150) according to claim 23.

30. A method for inspecting a volume or a composition of at least first fluid sample (11), said method comprising:
    (a) providing a pipette (1), in which at least one interface is formed between the at least one fluid sample (11) and at least a first fluid (15) which is adjacent to the first fluid sample (11), said interface being optically perceptible outside the pipette (1) in the first case as an about horizontal interface line (11*a*) between the at least one fluid sample (11) and the at least first fluid (15);
    (b) arranging at least one marking (33) of a camera (30) in an image field of the camera (30), such that the at least one marking (33) and at least a first section (1*c*, 1*d*) of the at least one pipette (1) are reproduced on a recorded image (38), with the at least one pipette (1) being arranged between a light source (20, 20*a*-20*e*) and the camera (30) such that at least one spectrum (13) of light beams (22-24) of the light source (20, 20*a*-20*e*) that have passed through the first fluid sample (11) can be recorded by the camera (30);
    (c) evaluating whether the at least one marking (33) in the recorded image (38) matches a position of at least one interface line (11*a*) in the at least first section (1*c*, 1*d*),
    (d) comparing a first recorded spectrum (13) with at least one reference spectrum; and
    (e) determining whether the composition of at least one first fluid sample (11) in accordance with the at least one recorded spectrum (13) corresponds to that of the at least one reference spectrum.

31. The method according to claim 30, further comprising:
    (a) providing a second pipette (2), in which at least one second interface is formed between the at least one second, fluid sample (22) and a second fluid (25) which is adjacent to the second sample (22), said interface being optically perceptible outside the at least second pipette (2) in a second case as an at least second about horizontal interface line (22a) between the at least second sample (22) and the second fluid (25);
(b) arranging the at least one marking (33) of a camera (30) in an image field of the camera (30), such that the at least one marking (33), at least one section (1c, 1d) of the at least one pipette (1) and a second section (2c, 2d) of the at least second pipette (2) are reproduced on a recorded image (38), with the pipettes (1, 2) being arranged between a light source (20, 20a-20e) and the camera (30) such that at least one spectrum (13) of light beams (22-24) of the light source (20, 20a-20e) that have passed through a first samples (11), and a second sample (22) can be recorded by the camera (10);
(c) evaluating whether the at least one marking (33) in the recorded image (38) matches the position at least of the first of the at least one interface line (11a) in the at least first section (1c, 1d) and the at least second interface line (22a) in the second section (2c, 2d),
(d) comparing the recorded spectra (13) in each case with reference spectra; and
(e) determining whether the composition of the first and second samples (11, 22) in accordance with the recorded spectra (13) corresponds to those of the reference spectra.

32. The method according to claim 30, wherein at least one recorded spectrum (13) is compared with at least one reference spectrum, to determine whether haemolytic or lipaemic factors are present in at least one sample (11, 22).

33. The method according to claim 31, wherein at least one recorded spectrum (13) is compared with at least one reference spectrum to determine whether haemolytic and/or lipaemic factors are present in at least first sample (11), and the at least second sample (22).

34. The method according to claim 30, wherein
(a) the pipette(s) (1, 2) is/are arranged between a light source (20, 20a-20e) and the camera (10) such that in a spectrum (13) of light beams (22-24) of the light source (20, 20a-20e) is recorded by the camera (10), said light beams having passed through at least one meniscus of the first sample (11), or the at least second sample (22), said meniscus/menisci being formed at least one edge of the interface to an inner wall of the pipette(s) (1, 2);
(b) at least one recorded spectrum (13) is compared with at least one reference spectrum; and
(c) it is determined whether the composition of the at least first and second sample (11, 22) in accordance with the at least one recorded spectrum (13) corresponds to that of at least one reference spectrum.

35. The method according to claim 31, wherein
(a) the pipette(s) (1, 2) is/are arranged between a light source (20, 20a-20e) and the camera (10) such that in a first case a spectrum (13) of light beams (22-24) of the light source (20, 20a-20e) is recorded by the camera (10), said light beams having passed through at least one meniscus of the sample(s) (11, 22), said meniscus/menisci being formed at least one edge of the interface to an inner wall of the pipette(s) (1, 2);
(b) at least one recorded spectrum (13) is compared with at least one reference spectrum; and
(c) it is determined whether the composition of the at least a first and a second sample (11, 22) in accordance with the at least one recorded spectrum (13) corresponds to that of at least one reference spectrum.

36. The method according to claim 31, wherein
(a) the first fluid (15) is formed as a gas bubble, such as an air bubble;
(b) in at least one pipette (1), in particular in at least two pipettes (1, 2), the gas bubble is arranged between a sample (11) and a further fluid (13) which is adjacent to the gas bubble, with a further interface formed between the further fluid (13) and the gas bubble being optically perceptible outside the pipette (1) as a further interface line (13a) between the further fluid (13) and the gas bubble that extends about horizontally;
(c) the recorded image (38) is composed of partial images (32, 35) recorded by the camera (30), wherein
(i) on a first partial image (32) a first section (1c) of the first pipette (1) is reproduced, which includes a first tip (1a) of the first pipette (1) and the first interface line (11a), and a second section (2c) of the second pipette (2) with a second tip (2a) of the second pipette (2) is reproduced;
(ii) on a second partial image (35), a third section (1d, 2d) of at least one pipette (1) with the further interface line (13a) is reproduced; and
(iii) both partial images preferably overlap.

37. The method according to claim 31, wherein the recorded image (38) is composed of partial images (32, 35) recorded by the camera (30), in which
(i) on a first partial image (32) a first section (1c) of the first pipette (1) is reproduced, which includes a first tip (1a) of the first pipette (1) and the first interface line (11a), and a second section (2c) of the second pipette (2) with a second tip (2a) of the second pipette (2) is reproduced; and
(ii) on the second partial image (35), a fourth section (2d) of the second pipette (1) with the second interface line (22a) is reproduced.

38. The method according to claim 31, wherein the camera (30) is arranged in a fixed location and the first pipette (1) and the second pipette (2) are moved through the image field of the camera (30).

39. The method according to claim 32, wherein the camera (30) is arranged in a fixed location and the first pipette (1) and the second pipette (2) are moved through the image field of the camera (30).

40. The method according to claim 33, wherein the camera (30) is arranged in a fixed location and the first pipette (1) and the second pipette (2) are moved through the image field of the camera (30).

41. The method according to claim 34, wherein the camera (30) is arranged in a fixed location and the first pipette (1) and the second pipette (2) are moved through the image field of the camera (30).

42. The method according to claim 35, wherein the camera (30) is arranged in a fixed location and the first pipette (1) and the second pipette (2) are moved through the image field of the camera (30).

43. The method according to claim 36, wherein the camera (30) is arranged in a fixed location and the first pipette (1) and the second pipette (2) are moved through the image field of the camera (30).

44. The method according to claim 37, wherein the camera (30) is arranged in a fixed location and the first pipette (1) and the second pipette (2) are moved through the image field of the camera (30).

45. The method according to claim 38, wherein the first partial image (32) and the second partial image (35) are shown overlapping.

46. The method according to claim 45, wherein a time stamp is assigned to the recorded image (38), which triggers a process step following the assignment of the time stamp, in a way that a simultaneous ejection of the first sample (11) out of the first pipette (1) and the second sample (22) out of the second pipette (2) takes place.

47. A device (150) for inspecting a volume or a composition of at least one sample (11), said device comprising:
(a) a first pipette (1), in which a first interface is formed between a first sample (11) and a first fluid (15) which is adjacent to the first sample (11), said interface being optically perceptible outside pipette (1) as a first interface line (11a) between the first sample (11) and the first fluid (15) that extends about horizontally;
(b) a camera (30) with a marking (33), which is arranged in an image field of the camera (30), such that the marking (33) and a first section (1c, 1d) of the first pipette (1) can be reproduced, with pipette (1) being arranged between a light source (20, 20a-20e) and the camera (10) such that a spectrum (13) of light beams (22-24) of the light source (20, 20a-20e) that have passed through the first sample (11) can be recorded by the camera (10); and
(c) an evaluation unit such as a computer or PC (130), which compares the marking (33) in a recorded image with a position of the interface line (11a) and in which said evaluation unit (130) comprises additional devices such as software or hardware which compare a recorded spectrum (13) with a reference spectrum and determine whether the composition of the first sample (11) in accordance with a recorded spectrum (13) corresponds to that of the reference spectrum.

48. The device according to claim 47, additionally comprising:
(a) a second pipette (2), in which a second interface is formed between a second sample (22) and a second fluid (25) which is adjacent to a second sample (22), said interface being optically perceptible outside the second pipette (2) as a second interface line (22a) between the second sample (22) and the second fluid (25) that extends about horizontally;
(b) a camera (30) with the marking (33), which is arranged in an image field of the camera (30), such that the marking (33), a first section (1c, 1d) of the first pipette (1) and a second section (2c, 2d) of the second pipette (2) are reproduced on a recorded image (38), with the pipettes (1, 2) being arranged between a light source (20, 20a-20e) and the camera (30), such that a spectrum (13) of light beams (22-24) of the light source (20, 20a-20e) that have passed through a first and a second samples (11, 22) can be recorded by the camera (30); and
(c) an evaluation unit (130), which compares the marking (33) in the recorded image (38) with the position at least one of the first interface line (11a) in the first section (1c, 1d) and the second interface line (22a) in the second section (2c, 2d) and in which the evaluation unit (130) comprises additional means which compare the recorded spectra (13) with reference spectra and determine whether the composition of the first or second samples (11, 22) in accordance with the recorded spectra (13) correspond to those of the reference spectra.

49. The device (150) according to claim 47, in which a pipette(s) (11, 22) is/are arranged between a light source (20, 20a-20e) and the camera (30) such that a spectrum (13) of light beams (22-24) of the light source (20, 20a-20e) can be recorded by the camera (30), said light beams having passed through a meniscus of the first and second (11, 22), which is formed at one edge of the interface to an inner wall of the pipette(s) (1, 2), and the evaluation unit (130) comprises additional means, which compare the recorded spectrum/spectra (13) with a/several reference spectrum/reference spectra and determine whether the composition of the first and second sample(s) (11, 22) in accordance with the recorded spectrum/spectra (13) corresponds to that/those of the reference spectrum/reference spectra.

50. The device (150) according to claim 48, in which the pipette(s) (11, 22) is/are arranged between a light source (20, 20a-20e) and the camera (30) such that a spectrum (13) of light beams (22-24) of the light source (20, 20a-20e) can be recorded by the camera (30), said light beams having passed through a meniscus of the first and second sample(s) (11, 22), which is formed at one edge of the interface to an inner wall of the pipette(s) (1, 2), and the evaluation unit (130) comprises additional means, which compare the recorded spectrum/spectra (13) with a/several reference spectrum/reference spectra and determine whether the composition of the first and second sample(s) (11, 22) in accordance with the recorded spectrum/spectra (13) corresponds to that/those of the reference spectrum/reference spectra.

51. The device (150) according to claim 47, wherein the evaluation unit (130) comprises additional means to compare the recorded spectrum/spectra (13) with one/several reference spectrum/spectra and determine whether haemolytic or lipaemic factors are present in first and second the sample(s) (11, 22).

52. The device (150) according to claim 48, wherein the evaluation unit (130) comprises additional means to compare the recorded spectrum/spectra (13) with one/several reference spectrum/spectra and determine whether haemolytic or lipaemic factors are present in the sample(s) (11, 22).

53. An analyser for analysing biological or chemical samples (11, 22) by means of a reagent liquid added using a pipette with a device (150) according to claim 18.

54. An analyser for analysing biological or chemical samples (11, 22) by means of a reagent liquid added using a pipette with a device (150) according to claim 48.

55. An analyser for analysing biological or chemical samples (11, 22) by means of a reagent liquid added using a pipette with a device (150) according to claim 49.

56. An analyser for analysing biological or chemical samples (11, 22) by means of a reagent liquid added using a pipette with a device (150) according to claim 50.

57. An analyser for analysing biological or chemical samples (11, 22) by means of a reagent liquid added using a pipette with a device (150) according to claim 51.

58. An analyser for analysing biological or chemical samples (11, 22) by means of a reagent liquid added using a pipette with a device (150) according to claim 52.

* * * * *